US011276038B2

(12) United States Patent
Rogers et al.

(10) Patent No.: US 11,276,038 B2
(45) Date of Patent: Mar. 15, 2022

(54) DISTRIBUTED DATA STORE FOR MANAGING MEDIA

(71) Applicant: Verifi Media, Inc., New York, NY (US)

(72) Inventors: Benji Rogers, Brooklyn, NY (US); Christopher Tse, New York, NY (US)

(73) Assignee: Verifi Media, Inc., New York, NY (US)

( * ) Notice: Subject to any disclaimer, the term of this patent is extended or adjusted under 35 U.S.C. 154(b) by 563 days.

(21) Appl. No.: 15/669,828

(22) Filed: Aug. 4, 2017

(65) Prior Publication Data

US 2018/0041571 A1  Feb. 8, 2018

Related U.S. Application Data

(60) Provisional application No. 62/454,750, filed on Feb. 4, 2017, provisional application No. 62/371,828, filed on Aug. 7, 2016.

(51) Int. Cl.
*G06Q 20/40* (2012.01)
*G06Q 30/02* (2012.01)
(Continued)

(52) U.S. Cl.
CPC ....... *G06Q 10/101* (2013.01); *G06F 16/2379* (2019.01); *G06F 16/48* (2019.01);
(Continued)

(58) Field of Classification Search
CPC ..... G06Q 10/00–30; G06Q 20/00–425; G06Q 2220/00–18; G06F 16/00–26; G06F 21/00–88; H04L 67/00–42
See application file for complete search history.

(56) References Cited

U.S. PATENT DOCUMENTS 7,797,352 B1  9/2010 Hopwood et al.
7,822,631 B1 * 10/2010 Vander Mey ...... G06Q 30/0201
705/7.29
(Continued)

FOREIGN PATENT DOCUMENTS

CN  105138625 A  12/2015
EP  1962277 A2  8/2008

OTHER PUBLICATIONS

Andreas M. Antonopoulos, Mastering Bitcoin, Dec. 2014, O'Reilly Media, Inc., First Edition (Year: 2014).*
(Continued)

*Primary Examiner* — John W Hayes
*Assistant Examiner* — Chenyuh Kuo
(74) *Attorney, Agent, or Firm* — Wolf, Greenfield & Sacks, P.C.

(57) ABSTRACT

Described herein are various embodiments of a system for tracking interests in content using a distributed data store. By being "distributed," there may be multiple different copies of the data store that each hold a portion or all of the data of the data store, with the different copies being continuously, periodically, or occasionally synchronized to ensure that data held in one matches the data held in another, but with no copy of the data store being treated as the official or canonical copy of the data store. The distributed data store may track the interests regarding the content in particular ways, including through storing information identifying the content and identifying interests in the content. The distributed data store may be used to track interests in media, such as to track ownership, management, or royalty interests in media like songs, to provide a mechanism for "Digital Rights Expression" (DRE).

6 Claims, 8 Drawing Sheets

(51) Int. Cl.
*G06Q 20/32* (2012.01)
*G06Q 20/34* (2012.01)
*G06Q 20/38* (2012.01)
*G06Q 10/10* (2012.01)
*G06F 16/23* (2019.01)
*H04L 29/08* (2006.01)
*G06F 16/48* (2019.01)
*G06F 21/10* (2013.01)
*H04L 67/50* (2022.01)
*H04L 67/104* (2022.01)
*H04L 67/1074* (2022.01)

(52) U.S. Cl.
CPC ......... *G06F 21/10* (2013.01); *G06Q 20/3827* (2013.01); *H04L 67/104* (2013.01); *H04L 67/108* (2013.01); *H04L 67/22* (2013.01); *G06Q 2220/00* (2013.01); *G06Q 2220/10* (2013.01)

(56) References Cited

U.S. PATENT DOCUMENTS

| | | | | |
|---|---|---|---|---|
| 8,548,810 | B2* | 10/2013 | Rodriguez | G10L 19/018 704/273 |
| 2007/0016586 | A1 | 1/2007 | Samji et al. | |
| 2007/0055689 | A1 | 3/2007 | Rhoads et al. | |
| 2007/0288478 | A1 | 12/2007 | DiMaria et al. | |
| 2010/0058920 | A1 | 3/2010 | Uehara | |
| 2010/0185732 | A1 | 7/2010 | Hyman | |
| 2010/0262606 | A1* | 10/2010 | Bedolla | G06F 16/90335 707/741 |
| 2014/0180762 | A1* | 6/2014 | Gilbert | G06Q 30/02 705/7.29 |
| 2014/0310264 | A1* | 10/2014 | D'Ambrosio | G06F 16/58 707/722 |
| 2014/0310819 | A1 | 10/2014 | Cakarel et al. | |
| 2015/0013016 | A1* | 1/2015 | Kanter | G06F 21/6245 726/28 |
| 2015/0127636 | A1 | 5/2015 | Hofstetter et al. | |
| 2015/0127940 | A1 | 5/2015 | Polehn et al. | |
| 2016/0321769 | A1 | 11/2016 | McCoy et al. | |
| 2016/0323109 | A1 | 11/2016 | McCoy et al. | |
| 2016/0378762 | A1* | 12/2016 | Rohter | H04N 21/2665 707/728 |
| 2017/0116693 | A1 | 4/2017 | Rae et al. | |
| 2017/0214522 | A1* | 7/2017 | Code | H04N 21/440263 705/34 |
| 2017/0255912 | A1 | 9/2017 | Casebolt | |
| 2018/0039942 | A1 | 2/2018 | Rogers et al. | |
| 2019/0253431 | A1 | 8/2019 | Atanda | |
| 2020/0034792 | A1 | 1/2020 | Rogers et al. | |

OTHER PUBLICATIONS

Extended European Search Report for European Application No. 17840062.8 dated Nov. 21, 2019.

Invitation to Pay Additional Fees for International Application No. PCT/US2017/45522 dated Sep. 28, 2017.

International Search Report and Written Opinion for International Application No. PCT/US2017/45522 dated Nov. 22, 2017.

Rogers, Before you ask, I think it's awesome . . . Medium. https://medium.com/@lovingyourwork/before-you-ask-i-think-its-awesome-6ba048b53278 Apr. 26, 2017. 5 pages. Last accessed Mar. 19, 2018.

Rogers, Building Identity, Authority, & Trust Into Songs—One Link at a Time (dotBC Update #6). Medium. Nov. 3, 2016. 7 pages. Last accessed Mar. 19, 2018.

Rogers, dotBlockchain Music Industry Partners Announcement & Queueing Site (dotBC Update #9). Medium. Feb. 1, 2017. 2 pages. Last accessed Mar. 19, 2018.

Rogers, How the Blockchain and VR Can Change the Music Industry (Part 1). Medium. Cuepoint. https://medium.com/cuepoint/bc-a-fair-trade-music-format-virtual-reality-the-blockchain-76fc47699733. Nov. 23, 2015. 12 pages. Last accessed Mar. 19, 2018.

Rogers, How the Blockchain Can Change the Music Industry (Part 2). Medium. Cuepoint. https://medium.com/cuepoint/how-the-blockchain-can-change-the-music-industry-part-2-c1fa3bdfa848. Feb. 24, 2016. 10 pages. Last accessed Mar. 19, 2018.

Rogers, Music Is Digital Gold—So Why Do We Treat It Like Digital Plastic? (dotBC Update #8). Medium. Dec. 17, 2016. 5 pages. Last accessed Mar. 19, 2018.

Rogers, Songs as skills. Medium. https://medium.com/benji-rogers/songs-as-skills-e31a8de35592 Jun. 23, 2017. 6 pages. Last accessed Mar. 19, 2018.

Rogers, Stop Trying to Pay Me and Pay Me!—Music on the Blockchain for Songwriters, Artists & Managers (dotBC Update #5). Medium. Oct. 13, 2016. 8 pages. Last accessed Mar. 19, 2018.

Rogers, The Dot Blockchain Music Project Alpha Release—(dotBC Update #4). Medium. Aug. 25, 2016. 12 pages. Last accessed Mar. 19, 2018.

Rogers, The Dot Blockchain Music Project—"Growing up in public with your pants down." (dotBC Update #3). Medium. https://medium.com/dotblockchainmusic/the-dot-blockchain-music-project-growing-up-in-public-with-your-pants-down-93abf75a2727. Aug. 11, 2016. 8 pages. Last accessed Mar. 19, 2018.

Rogers, The dotBlockchain Music Project—update #7 Minimum Viable Data Doc. Dec. 8, 2016. 4 pages. Last accessed Mar. 19, 2018.

International Preliminary Report on Patentability for International Application No. PCT/US2017/45522 dated Feb. 21, 2019.

PCT/US2017/45522, Feb. 21, 2019, International Preliminary Report on Patentability.

U.S. Appl. No. 16/592,891, filed Oct. 4, 2019, Rogers et al.

EP 17840062.8, dated Nov. 21, 2019, Extended European Search Report.

U.S. Appl. No. 15/669,809, filed Aug. 4, 2017, Rogers et al.

PCT/US2017/45522, dated Sep. 28, 2017, Invitation to Pay Additional Fees.

PCT/US2017/45522, dated Nov. 22, 2017, International Search Report and Written Opinion.

* cited by examiner

DISTRIBUTED DATA STORE FOR MANAGING MEDIA

RELATED APPLICATIONS

This application claims priority under 35 U.S.C. § 119(e) to U.S. Provisional Application Ser. No. 62/371,828, titled "Blockchain anchored format wrapper" and filed on Aug. 7, 2016, and to U.S. Provisional Application Ser. No. 62/454, 750, titled "A format wrapper with tagging, trust, and authority in a blockchain-based tracking system" and filed on Feb. 4, 2017, each of which is herein incorporated by reference in its entirety.

BACKGROUND

1. Technical Field

Described herein are embodiments of a system for enabling tracking of interests in content using a distributed data store of information regarding the content, including for calculating and storing, in the distributed data store, a score indicative of a reliability of data regarding the content in the distributed data store, wherein the score may be calculated based on a nature of interactions with the distributed data store regarding the content and an identity of the interacting party.

2. Discussion of Related Art

Many different parties may be involved in the creation of media content. For example, a song may be written by multiple people, such as by multiple people who collaborate in writing the music for the song (e.g., they may separately or collaboratively write a bass line, a beat, a melody for a part of the song, a harmony for that melody, etc.) and potentially multiple other people who collaborate in writing lyrics for the song (e.g., they may separately or collaboratively write verses, choruses, a bridge, etc.). That same song may then be performed by multiple people, such as singers and musicians who work together in the performance and may be different from the writers of the song. If a song samples work of another (e.g., by incorporating a small part of a prior work), writers and performers of the source song may be credited in the creation of the song. Further, beyond the writers and performers, there may be many other people involved in the creation, recording, or distribution of the song, such as managers, record labels, producers, studio engineers, publishers, and others.

Each of these parties may hold rights in a media content and may be due royalties for performances of the media content or for revenues received from distribution of the media content. Performing Rights Organizations (PROs) may track contribution to a song, to determine who is to receive royalties.

SUMMARY

In one embodiment, there is provided a method for maintaining a distributed data store storing information regarding a plurality of media contents and a record of interactions with the plurality of media contents. The method comprises determining a reliability of information input by a user to the distributed data store. Determining the reliability comprises, in response to determining that the user has asserted an identity, determining whether the user has input to the distributed data store information consistent with the identity, retrieving first information on one or more relationships, existing outside of the distributed data store, between the user and one or more other users of the distributed data store, retrieving second information on subsequent action taken on information regarding media content input by the user to the distributed data store, wherein the subsequent actions include actions by other users confirming or challenging the information input by the user, and calculating a reliability metric for the user based on whether the user has asserted an identity and input information consistent with the identity, the first information on the one or more relationships between the user and the one or more other users, and the second information on the subsequent action.

In another embodiment, there is provided a method for maintaining a distributed data store storing information regarding a plurality of media contents and a record of interactions with the plurality of media contents. The method comprises determining a reliability of information stored by the distributed data store regarding a first media content. Calculating a score comprises evaluating a plurality of attributes characterizing the media content that are stored by the distributed data store, the plurality of attributes being a minimum permissible characterization of the media content. Determining the reliability further comprises, for each of one or more records in the distributed data store recording an interaction of a user with the media content, identifying the user and retrieving a trust score for the user and retrieving information on subsequent action taken on the interaction of the user with the media content, wherein the subsequent actions include actions by other users confirming or challenging the information input by the user. Determining the reliability further comprises calculating a reliability metric for the media content based on the evaluation of the plurality of attributes characterizing the media content, the trust score for the user for each of the one or more records, and the information on the subsequent action for each of the one or more records.

In a further embodiment, there is provided a method for maintaining a record of identity of users of a distributed data store, the distributed data store storing information regarding a plurality of media contents and a record of interactions with the plurality of media contents. The method comprises, in response to receiving a notification from the distributed data store that a first user of the distributed data store has associated, in the distributed data store, a second user with a first media content, prompting for a confirmation of or challenge to the association of the second user with the first media content. The method further comprises, in response to receiving a challenge to the association, transmitting to the distributed data store a request to record, in connection with the first media content, a challenge of the association, and, in response to receiving a confirmation of the association, transmitting to the distributed data store a request to record, in connection with the first media content, an indication that the association has been confirmed.

In another embodiment, there is provided at least one non-transitory computer-readable storage medium having encoded thereon executable instructions that, when executed by at least one processor, cause the at least one processor to carry out the method of any one or any combination of the foregoing methods.

In a further embodiment, there is provided an apparatus comprising at least one processor and at least one storage medium having encoded thereon executable instructions that, when executed by the at least one processor, cause the at least one processor to carry out the method of any one or any combination of the foregoing methods.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
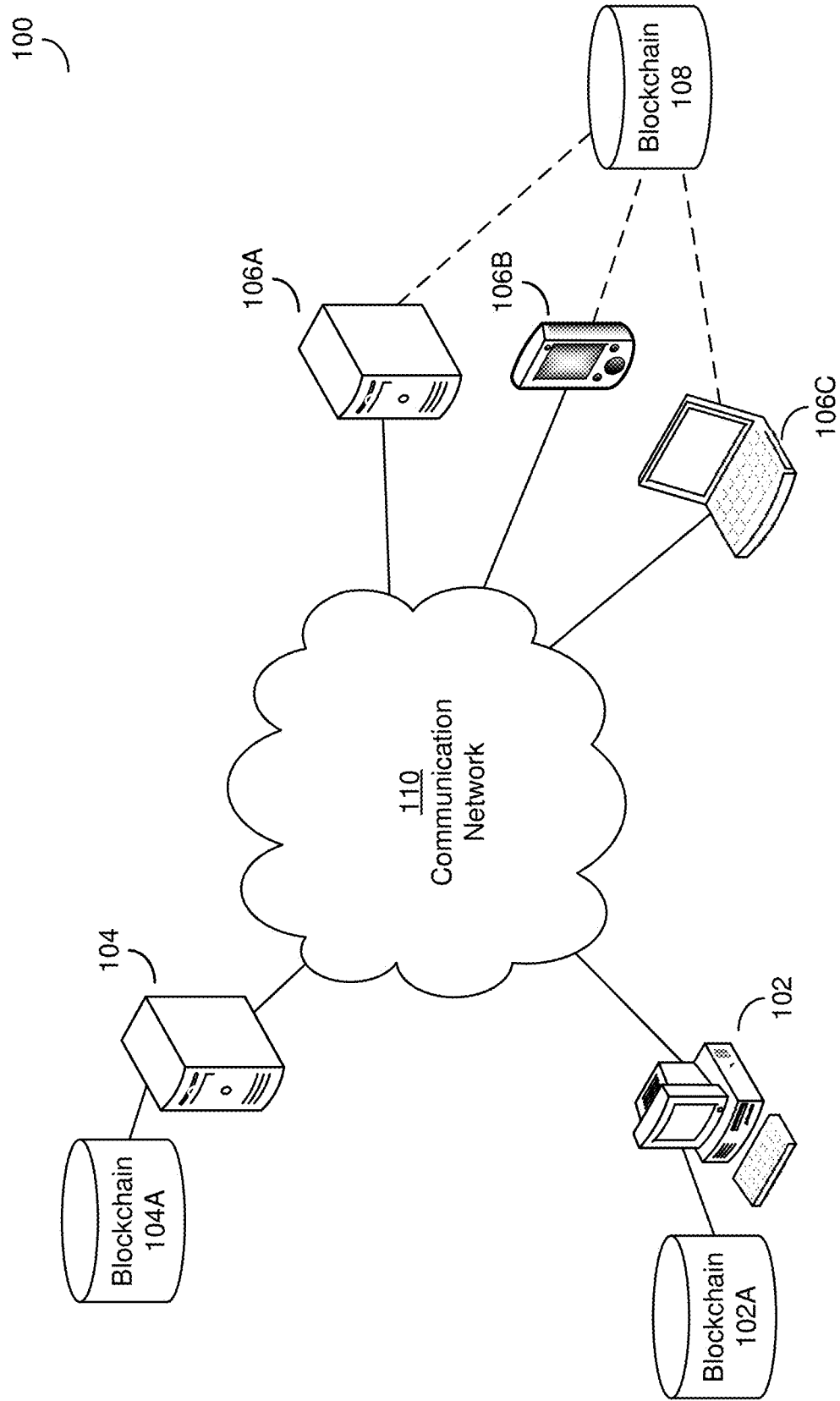
FIG. 1 is an illustration of a computing environment in which some embodiments may operate, including a music workstation, a computing device associated with a performing rights organization (PRO), and computing devices adapted to play media stored in one or more distributed data stores as disclosed herein.

Described herein are various embodiments of a system for tracking interests in content using a distributed data store. By being "distributed," there may be multiple different copies of the data store that each hold a portion or all of the data of the data store, with the different copies being continuously, periodically, or occasionally synchronized to ensure that data held in one matches the data held in another, but with no copy of the data store being treated as the official or canonical copy of the data store. The distributed data store may track the interests regarding the content in particular ways, including through storing information identifying the content and identifying interests in the content.

The distributed data store may be used to track interests in media, such as to track ownership, management, or royalty interests in media like songs, to provide a mechanism for "Digital Rights Expression" (DRE). DRE differs from "Digital Rights Management" (DRM), including in that while DRM may focus on techniques for precluding unauthorized access to media such as through encrypting and then regulating decryption of the media, DRE may aid with identifying who participated in the creation of the media and identifying who may authorize an access to the media and identifying consequences of an access, like actions to be taken responsive to an access and parameters of those actions, such as where a notification of a royalty-triggering event (e.g., public performance) should be sent. DRE may therefore not itself be used for regulating the access, or may not relate to any encryption or other restriction of the media. In some cases, DRE may be used alongside DRM, for example, DRE may track interests in a song that is protected using a DRM technique.

To realize such Digital Rights Expression, the distributed data store may be configured with a number of tools to help demonstrate reliability of data stored in the data store. Some conventional data stores may take steps to ensure reliability of data, including by preventing any potentially-unreliable data from being entered into the data store. Such steps make the data store or the operator of the data store the arbiter of reliability. The distributed data store of some embodiments may take a different approach, by instead storing in the data store information that may demonstrate to a user of the data store reliability of the data store's information characterizing the media. The data store may then enable users of the data store to leverage the indications of reliability to make their own determinations of the reliability of the data. Demonstrating reliability in this manner, rather than assuming responsibility for ensuring and policing of reliability, may contribute to the "distributed" nature of the system and have certain advantages, as discussed below.

As an example of such techniques for demonstrating reliability, in some embodiments, the distributed data store may be configured with, and enforce, rules regarding a minimum set of information to be stored characterizing media, such as information identifying the media and/or interests in it, before information about the media is permitted to be added to the distributed data store. The minimum set of information characterizing a song, for example, may include identifying information for the song, such as a title of the song, as well as information identifying an interest in the song, such as an artist (e.g., writer, musician, etc.) who owns rights in the songs and/or is to be paid royalties for the song. Ensuring that information about media is only stored in the data store when there is more than a minimum amount of information may aid in preventing low-quality, and unreliable, information from being stored.

As another example of techniques to aid in demonstrating reliability, in some embodiments, the distributed data store may track, on a media-by-media basis, interactions with the data store regarding each media. Interactions with the data store regarding each media may include adding or editing information characterizing the media, such as adding or editing information identifying interests in the media (e.g., an artist who contributed to the writing or performing of media, or record label who owns rights in a song), or adding or editing information regarding a consequence of an access. A consequence of an access may include an action that is to be taken before, during, or after an access, like sending a notification that a royalty-triggering event (e.g., a public performance) has occurred. Storing information on such an action may include, for example, storing information or parameters of an action, such as identifying where such a notification should be sent. In tracking interactions with the data store, the distributed data store may store identifying information for the party that was interacting with the data store. The information regarding the interactions with the data may be freely accessible in the data store, ensuring that users of the data store may be able to query the data and make their own determinations of reliability.

In some embodiments, the system including the distributed data store may use information on a media and/or on a set of interactions with the data store to calculate a value indicative of a potential reliability of the data regarding the media. For example, the system may evaluate how much information has been stored characterizing the media (e.g., relative to a set of potential characterizing information, or relative to other media), and/or evaluate past interactions with the information regarding the media (e.g., how much information has been edited following being added), and/or by evaluating the identity of users who have interacted with the information regarding the media and the interactions of those users with other media (e.g., how often information added by a user is later edited, which may indicate whether the user is generally reliable). The distributed data store may make this value available, along with the information regarding a song, to aid users in determining reliability of stored information.

As a further example of techniques to aid in demonstrating reliability, in some embodiments, if an interaction with the information regarding a piece of media results in a user being associated with a song, such as if a user is identified as an artist who contributed to a song, the distributed data store may notify the user of the association. As part of the notification, the user may also be prompted to accept or reject the association. The user's response to the notification may be incorporated into an indication of reliability for the song, as discussed below.

The inventors have recognized and appreciated that the Digital Rights Expression (DRE) techniques described herein, including the distributed nature of the technology described herein, may have certain advantages.

More specifically, the inventors have recognized and appreciated that there has been widespread difficulty in the music industry, stretching back decades, in tracking contributions to a song and tracking who would be owed royalties to a song. Particularly in cases when there are multiple writers of a song, such as writers of different parts of the lyrics or writers of different melodies for different parts of a songs, but even in simple cases where a band includes a handful of musicians that all contributed to a performance of a song, the music industry has been unable to consistently and dependably track who was involved in the production of a song. Because the industry cannot track who was involved in the production of a song, the industry also cannot properly compensate contributors. As a result, for decades, it has been common for contributors to a song to be under-compensated. Contributors may have contracted to receive a royalty that is some small fraction (e.g., less than one percent) of the total revenues for a song, but because the contributors are not reliably tracked, those funds cannot be delivered or reliably delivered to the contributor.

Attempts have been made at mitigating this problem. Performance Rights Organizations (PROs) were established decades ago to, in part, track rights in music and ensure royalties are properly collected and distributed. Such PROs would aggregate, at a single point, information on who has contributed to a work and who is owed for performances of the work. Despite continued efforts of PROs, the problem remains widespread. Attempts have also been made at computer-implemented approaches to tracking contributors to a song, such as the Global Database Repertoire (GDR), the International Music Joint Venture, and the International Music Registry. All were designed to address these difficulties in tracking rights by allowing content creators to register their work in one centralized location, which would allow for those playing songs (and owing royalties) to easily identify the content creators and funnel payments to the content creators. Similar to the conventional approach of a centralized organization like a PRO, all of the conventional computer-implemented approaches included centralized databases, and despite active interest from the industry, all were failures at addressing the problem.

As a result of the difficulty in correctly channeling compensation to those who contributed to a song, the music industry estimates that annually, millions of dollars are lost or misallocated due to a lack of information about rights ownership. In total, this under-compensation likely amounts to billions of dollars. This substantially impacts the ability of artists to receive income for their work, and has a sizeable negative impact on the industry. Though widely acknowledged and stretching back decades, this problem persists due to difficulties that have been encountered in all conventional approaches.

The inventors have recognized and appreciated that a distributed approach to Digital Rights Expression (DRE) and to storing information regarding interests in a song would be advantageous, and mitigate difficulties encountered by prior approaches. The inventors recognized and appreciated that all conventional approaches failed in large part because of inherent challenges in the kind of centralized authority that accompanies having a centralized database. A centralized authority, such as the operator of the database, takes responsibility for ensuring the completeness of the data and ensuring the accuracy of the data, including for resolving conflicts or disputes about the data. All those who have attempted to address this problem in the past viewed this assumption of responsibility as necessary, to ensure that users could trust the stored data. The inventors recognized and appreciated, however, that assumption of responsibility for completeness and accuracy (in sum, reliability) is unnecessary. The inventors appreciated that for a data set as large and diverse as media rights information, centralized responsibility for reliability is untenable. The inventors instead recognized the advantages of a data store that explicitly does not assume responsibility for reliability and instead devolves that responsibility on users. In that context, though, the inventors appreciated that some mechanism related to reliability would be advantageous. The inventors recognized that an advantageous form of such a mechanism would be one that demonstrates to a user the data, the source of the data, and other indicators of reliability. These features would enable a user to make his or her own determination of reliability. The inventors further appreciated that, while a centralized data store could offer such functionality, a particular form of a distributed data store would be advantageous for reasons that will be appreciated from the discussion below.

Accordingly, some embodiments described herein administer rights information using a distributed data store. The distributed data store may store information about content and maintains a chronological log of interactions with that content. In some embodiments, the distributed data store may be implemented as a blockchain. Embodiments are not limited to operating with any particular implementation of blockchain technologies, and may operate with different examples of blockchains such as a Bitcoin-style blockchain, an Ethereum-style blockchain, a blockchain according to the approaches developed by Hyperledger, or other blockchain technologies.

In some embodiments, media for which information is stored in the distributed data store may be associated with a particular file structure. The file structure may, in some cases, include data for the media (e.g., binary data for the audio, video, etc. of the media), while in other cases the file structure may include a reference to a location (e.g., using a Uniform Resource Identifier (URI) or other identifier) at which the data can be accessed or from which the data may be obtained. The file structure may also include an identifier for the media that is unique with respect to the distributed data store, and may include an identification of the distributed data store that stores the information on the media. Some or all of the content of the distributed data store may be included within the file structure, such as a set of information characterizing the media and (in embodiments that include such a score) a score indicating the reliability of the information. When a media player uses a file having this file structure to play media, in some cases the media player may use the identifier for the media and the identifier of the distributed data store to synchronize the information included within the file with the distributed data store, which can help ensure the file is kept up-to-date. The media player may also use the file to access the distributed data store and identify who is to be paid or notified of a performance of the song, and log that a notification or payment is to be sent to the party or send such a notification or payment to that party.

In some embodiments, more than one distributed data store, or more than one blockchain, may be used to store information on interests in media. For example, in some embodiments, information characterizing a song may be divided into information that is public and information that is non-public or private. Public information may include information that is publicly-viewable through the system, where the "public" may be any registered or unregistered user of the system. Publicly-viewable information may include information that may be used by others in identifying a piece of media or using the media, such as information regarding a name of a song or an artist who contributed to a song. In some cases, all information about a media or about interests in a media may be public. In other cases, some information characterizing a media may be private. In some cases, for example, information on a rate of a royalty due to a particular contributor to a song may be stored in a distributed data base, but that contributor or any other party may wish that information not to be publicly-viewable. In some such cases, non-public information may not be stored in the same distributed data store (e.g., the same blockchain) with public information, but may instead be stored in different distributed data store (e.g., a different blockchain). In some such cases, both blockchains may be referenced in the file for a media.

As discussed above, the inventors recognized and appreciated that prior approaches to centralized storage of information on media and interest in the media failed, in part due to limitations on the need to ensure reliability of data. The inventors have recognized and appreciated the advantages not only of a distributed system, but of a distributed system that does not take responsibility for ensuring reliability of data but instead demonstrates the reliability of data in a manner that enables users of the system to determine whether information for a particular media is reliable and whether and how to use that information.

Media for which information is stored in the distributed data store may be associated with a number of attributes: information identifying the media (e.g., title), information identifying interest in the media (e.g., rights ownership information), a record of interactions with the media content, as well as (in some cases) data for the actual media itself. These attributes may be stored in the distributed data store. In some cases, the distributed data store may impose requirements on minimum data to be stored regarding a media before a record for the media can be created in the distributed data store. For example, in the case of a song, minimum permissible characterization may comprise the song itself, information about the artist, the recording studio, and the producer. The use of minimum permissible characterization may help ensure that every record on the distributed data store comprises a minimum amount of sufficient information to be accessed by a user interacting with the media content on the distributed data store, and help ensure reliability of the data.

The distributed data store may also include a score or evaluation of trust for media information in the distributed data store. In some embodiments, the score for the media content may be a reflection of the score for individuals or parties connected to the media content as well as the number of conflicts or inconsistencies within the record of interactions for the media content. The score for individuals or parties connected to the media content may be determined at least in part by the scores of other individuals or parties tied to that individual or party as well as a point of reference for the user or party. For example, a point of reference for a party may be any suitable identity verification, such as credit card information or a social media account.

The distributed data store may also allow users to associate other users with a media content on the distributed data store. For example, if the media content were a song, stored on the distributed data a first party, such as a representative for a recording label, could associate a second party, such as a musician for the song, with the media content on the distributed data store. That interaction may additionally be stored on the record of interactions for the media content on the distributed data store. In some embodiments, that interaction may only be stored if the second party agrees to the connection. In some embodiments, that interaction may be stored if the second party does not interact with the connection.

Examples are described below of particular environments in which embodiments may operate, and particular techniques that may be used in embodiments to achieve different functionality. It should be appreciated, however, that embodiments are not limited to operating in accordance with these examples, and that other implementations are possible.

In addition, while for ease of description some of the examples are discussed in connection with distributed data stores that are described as "blockchains" and media is described as "songs," it should be appreciated that embodiments are not so limited. Embodiments may operate with other distributed data stores and may operate with media that may be audio, visual (e.g., still image and/or video), or audiovisual.

FIG. 1 illustrates a computing environment 100 in which some embodiments may operate. The environment 100 includes a variety of devices that, as discussed below, may be operated by different users to perform functions described herein. The devices may communicate via network 110, which may include one or more wired and/or wireless, local and/or wide-area networks, including the Internet.

The environment 100 may include a music workstation 102 or what may be alternatively referred to as a digital audio workstation. (For ease of description, the embodiment of FIG. 1 will be described in connection with an example in which the media content is music, but it should be appreciated that embodiments are not limited in this respect.) The music workstation 102 may be used by one or more users, such as a sound or production engineer, to create or edit media content, such as a song. The music workstation 102 may be a part of a production booth or music recording station in some embodiments.

The music workstation 102 may be configured with and execute an ingestion facility, which may obtain music data for a song, such as through a live recording of a studio session in which music is captured through a microphone or other audio input device and received by the music workstation. Additionally or alternatively, the ingestion facility may receive data for music from recordable media read by the music workstation (e.g., from a CD-ROM, minidisc, or other storage media), via a network from another device, and/or otherwise input to the music workstation.

In some embodiments, music data received by the ingestion facility may be used in creating a record for the song on a blockchain, as discussed in detail below. In other embodiments, music received by an ingestion facility may be edited using music editing techniques, which may be implemented by the ingestion facility or another facility (or combination of facilities) executing on the music workstation. The editing performed on media may include equalizing, sampling, cutting, mixing, finding, filtering, noise reduction, any suitable form of music editing known in the art, as embodiments are not limited in this respect. In some cases in which music editing is performed, the editing may be performed by the ingestion facility or triggered by the ingestion facility, while in other cases the music editing may be performed by a facility prior to input of the music data to the ingestion facility, as embodiments are not limited in this respect.

The ingestion facility of the music workstation 102 may create a record for the song including data about the song. Data about a song may include data identifying a song, such as a title of the song. In addition, as discussed above and in accordance with the Digital Rights Expression (DRE) of some embodiments, the data about a song may include data regarding interests held by one or more people or entities in the song, including information identifying the person/entity and information identifying the interest held in the song.

In some embodiments, as discussed above, a system including a distributed data store for tracking interests in media may not ensure accuracy or completeness of data about a media, or otherwise centralize responsibility for reliability of data about the media. Rather, some embodiments may use one or more techniques to aid in encouraging contribution of reliable data or aid in demonstrating the reliability of the data in the record. Some embodiments may leverage a set of minimum permissible characterization for records associated with media in a distributed data store. As discussed above, the minimum permissible characterization may aid in preventing low-quality unreliable records from being added to the distributed data store.

Accordingly, the ingestion facility of the music workstation 102 may, as part of creating a record for the song on the blockchain 102A, create minimum permissible content associated with the song and the music data for the song. The minimum permissible characterization may be required by the blockchain 102A to add the media content to the blockchain 102A or create a record for the media content in the blockchain 102A. For example, in the case of a song, minimum permissible characterization may include the song itself, information about the song, information about the artist, and a unique identifier for the song in the data store. The song itself may be included in the record as music data (i.e., binary music data, in some cases encoded or compressed, and/or protected DRM) and/or a link to a suitable location from which the music data could be retrieved via a network. Information about the song may include information identifying the song. This may include a title for the song, and/or other attributes such as an album for the song or a year the song was released. Information regarding the artist may be for a performer or group of performers (e.g., band, symphony) for the song, such as a band who recorded the song, or for other artists affiliated with a song, such as a composer, arranger, writer, or other artist. The unique identifier may be an alphabetic, numeric, or alphanumeric value that may be used in the distributed data store to identify the record. The minimum permissible characterization may additionally or alternatively include other information for a song, such as information identifying the recording studio associated with the music workstation 102, and information on actions to be taken responsive to a playback or other access of a song such as a listing of the people or entities owed royalties for use of the song, and contact information for each of those people or entities. The content of the minimum permissible characterization is not limited to any particular type or types of information regarding a song. The use of minimum permissible characterization may help ensure that every record on the distributed data store includes sufficient information for the user to access and use the data, when interacting with the media content on the distributed data store, and help the user understand the reliability of the data in the data store, as the minimum permissible characterization may include enough information for the user to make a determination of reliability.

The blockchain 102A may be a distributed instance of distributed data store. As should be appreciated from the foregoing, embodiments are not limited to using any particular blockchain technology, nor are embodiments limited to using a distributed data store that implements blockchain technology. The blockchain 102A may synchronize content with any or all of the other blockchain instances 104A and 108 through the communication network 110. There may be multiple different copies of the data store that each hold a portion or all of the data of the data store, with the different copies being continuously, periodically, or occasionally synchronized to ensure that data held in one matches the data held in another, but with no copy of the data store being treated as the official or canonical copy of the data store.

A file wrapper local to the music workstation 102 may also be created, corresponding to a record of a media content on the blockchain 102A. The file wrapper may indicate a storage location of the record of the media content on the blockchain through any suitable means, such as a universal resource locator (URL), a hyperlink, a blockchain identifier, or a pointer, for example. The file wrapper may be shared or exchanged between users, so that a user receiving the file wrapper may play the song or otherwise perform operations using the song. The file wrapper may include any or all of the content from the record of the media content on the blockchain, including, for example, the minimum permissible characterization. As another example, the file wrapper may contain information on responsive actions like the royalty payment information for the song, which may be used to identify to whom royalties are due and how to pay the royalties. The file wrapper may synchronize with the blockchain 102A, to receive updated information regarding any or all of the associated record in the blockchain 102A.

In some embodiments, the music workstation 102 may (instead of being a digital audio workstation or other specialty device) be a computing device (e.g., laptop or desktop, personal computer, smart phones, or other devices) operated by a user such as an end consumer, which may have a library or other storage of media content. The user computer 102 may add some or all of its media content to the blockchain 102A. In some embodiments, the user may not have direct rights to the media content, or may only have rights to the media content as a consumer, such as only having the rights to own a single copy of the song and to play a song as a private performance and not as a public performance, or similar rights. A user may operate the ingestion facility on the device to add the media content to the blockchain 102A. In some embodiments, the ingestion facility may only allow the user to upload information about a song without the music data, such as by instead providing a way for the user to input a link to a source of the media data on, for example, the Internet. This may aid in preventing privacy, by preventing the user from uploading song data without authorization, but still allowing the user to create a DRE record in the block domain.

The environment 100 may also include a PRO device 104. A PRO device may be any device used by a Performance Rights Organization (PRO) to track rights in music and/or ensure royalties are properly collected and distributed. PROs conventionally aggregate, at a single point, information on who has contributed to a work and who is owed for performances of the work. The PRO device 104 may have its own copy of the blockchain 104A, which may be synchronized to the blockchain 102A, in some embodiments. In some embodiments, the device 104 may execute an ingestion facility like that described above to add a record for a song to a blockchain In some embodiments, the blockchain 104A may be multiple blockchains. For example, the blockchain 104A may include a first blockchain, synchronized to the public blockchain 102A, and a second blockchain, containing data private to the PRO. For example, in some embodiments, information characterizing a song may be divided into information that is public and information that is non-public or private. Some of the distributed data stores may store only public information, only private information, or both. A "private" distributed data store may be a distributed data store for which registration to gain access, and/or access, is limited to a group of potential users who meet one or more criteria. Such criteria may vary between embodiments, and may include users having a particular employer, or a particular contractual relationship (e.g., artists having a relationship with a particular PRO), having been invited by an existing user, or other criterion. A "public" distributed data store is distinguished from a private data store by having a more expansive or an open pool of potential users. Some public distributed data stores may still require that users register to gain access, but the public distributed data stores may not impose requirements on who may qualify as a user.

Various types of information may be classified as public, as embodiments are not limited in this respect. Financial information may be one form of private data, in some embodiments, while related information identifying who is related to a song (and, in some cases, therefore who is owed money) may be public. For example, the public blockchain may identify, as an action that is to be taken following a playback, that a royalty is owed to artists. The data on the blockchain may indicate that the PRO is coordinating royalty payments and is to be notified of royalties due. Accordingly, the PRO may receive a notification of a public performance of a song. The PRO then may use the royalty information or DRE information in the private blockchain to determine who specifically is to be compensated and/or how much to compensate each person or group associated with the song. The PRO may want to participate in the blockchain system and receive notifications via the system, but may not want to make the business data (e.g., royalty information) available to the public.

The PRO may also use the PRO device 104 to track, monitor, or manage royalty payments. The PRO may use information stored in the blockchain 104A to determine relative amounts and/or distribution methods for royalties owed to various users associated with a song when the song is played commercially, for example.

The PRO device 104 may also be used to receive and/or send notifications, as will be described in further detail below. For example, the PRO device 104 may receive a notification through the PRO device 104 that the PRO has been "tagged" in a media content or that an artist or other user for whom the PRO manages rights her been tagged. The PRO device 104 may receive a notification because the PRO or another party supplied an identifier for the PRO device 104 or for a user account affiliated with the PRO device 104 (e.g., an email address, user ID, or other account identifier to the blockchain and indicated that notifications for the PRO or artists should be sent to the device 104 or account. A tag may associate the PRO or an artist with the record of the media content in the blockchain 104A such as by identifying that the PRO has an interest in the media content, such as by identifying a particular role the PRO or artist supposedly played with the media content. The tag may identify, for example, that an artist wrote or performed the song, or that the PRO is to be notified of a royalty-triggering event for the song. The PRO may also use the PRO device 104 to tag another user in a record for a media content in the blockchain 104A. For example, the PRO may tag an artist whose rights are managed by the PRO in a record for a media content that the artist is associated with. The tag may associate the artist with the media content in the blockchain 104A.

The environment 100 may also include devices 106A, 106B, and 106C (including or collectively referred to herein as devices 106), configured to consume media content and/or interact with the blockchain 108. The devices 106 may receive a file that includes content or the blockchain 108 for a song. For example, any of the devices 106 may receive a file corresponding to a record for a media content on the blockchain 108 which, as discussed above, may include the minimum permissible characterization or other attributes of the song. The file may include only the media content, or any parts of the record for the media content. The device 106 may access the file, including the content from the blockchain with the DRE material, to play back or otherwise access the song. As discussed above, the file may include the music data or may include an identifier (e.g., URI, URL) for a source of the music data, in addition to the DRE material. The device 106 may therefore play the song or otherwise access the song (e.g., for editing or other purposes) using the file. By accessing the song using the DRE file, the device 106 may be able to, or required to by smart contracts or other access control mechanisms in the file, perform one or more action related to the song. For example, the record for the song on the blockchain may specify that each playback of the song be logged in the blockchain, or that a notification of a royalty-triggering event be sent to a designated entity, before playback is performed. These controls may be laid out in the file. In some cases, the music data (either included in the file, or available from a source) may then also be protected with a DRM technique, but embodiments are not limited in this respect.

The devices 106 may interact with the blockchain 108 to verify the accuracy of the file received from the blockchain 108. For example, the device may use a blockchain identifier associated with the file to identify the record for the media content within the blockchain 108, and may verify the rights of the device 106 relative to the media content in the instance of a royalty-triggering event, or otherwise verify content.

The devices 106 may also interact with the blockchain 108 by adding information to the blockchain 108. The devices 106 may execute an ingestion facility like that described above to add the record to a blockchain for media. For example, any of the devices 106 could, after receiving the file described above, update a ledger within the blockchain corresponding to the media content to log that the device has accessed the media content. As another example, any of the devices 106 could tag a user associated with the media content in the blockchain.

In the case where the media content is a song, the devices 106 may perform a playback operation. The device 106 may play the song directly, once the song is obtained by the device 106. In some embodiments, the device 106 may verify that the user of the device 106 has the right to play the song by determining its rights through the blockchain 106, as described in greater detail herein. In some embodiments, the device 106 may play the song through a playback facility. The playback facility may handle the rights verification, as well as any of royalty payments, PRO interactions (such as notifying the PRO of playback), storage of the song, editing of blockchain records, tagging notification, and/or playback of the song. In some embodiments, the playback facility may be similar to music streaming services, such as Pandora® or Spotify® and the device 106 may be a server (including one or more virtual machines, a distributed set of coordinated servers, or other server implementation). In some embodiments, the playback facility may be an application local to the device 106 that performs any of the capabilities described above.

Figure 2:
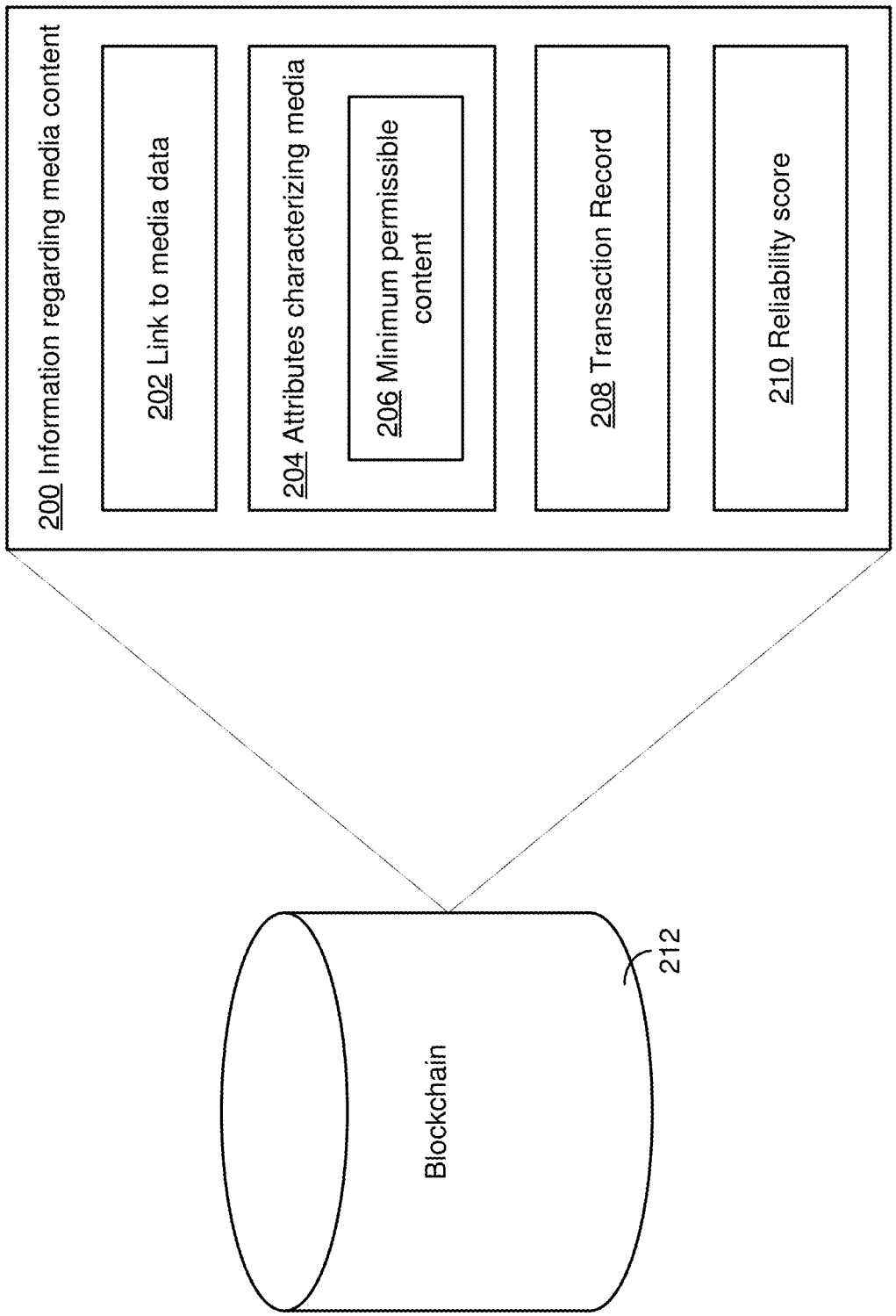
FIG. 2 is a block diagram of some information regarding a media that may be stored by a distributed data store in accordance with some embodiments.

FIG. 2 is a block diagram of some information regarding a media that may be stored by a distributed data store 212 in accordance with some embodiments. The distributed data store 212 may be a blockchain or other distributed storage, as described above, and may contain information 200 regarding media content. The information 200 may comprise a link 202 to media data, attributes 204 characterizing the media, a transaction record 208, and a reliability score 210. The link 202 to media data may comprise any suitable content for granting a user access to the media data. For example, in some embodiments the link 202 may be an address or identifier like a URI or URL, a pointer to a location of the media data in memory or a web address for a remote server or remote data store. In some embodiments, in addition to or as an alternative to storing a link for a source of the music data, the record might include the music data, such as by storing a digital representation of a waveform for the music data. In cases in which the music data is stored, the music data may in some cases be compressed or encrypted using suitable techniques for encoding to limit storage size or DRM techniques for controlling distribution or access. As should be appreciated from the foregoing, though, embodiments are not limited in this respect. The attributes 204 characterizing the media may include the attributes identified in the minimum permissible characterization 206, and any other attributes characterizing the media. The minimum permissible characterization 206 may be information characterizing a song, for example, may include identifying information for the song, such as a title of the song, as well as information identifying an interest in the song, such as an artist (e.g., writer, musician, etc.) who owns rights in the songs and/or is to be paid royalties for the song. In some embodiments, the distributed data store 212 may require that the attributes 204 for any or all media content stored on the distributed data store 212 contain minimum permissible characterization 206. In some embodiments, other components of the system 100 may enforce the requirement that the attributes 204 for any or all media content stored on the distributed data store 212 contain minimum permissible characterization 206. For example, ingestion facilities that create records in the distributed data store 212 may be configured not to create a record until at least information for the minimum permissible characterization is available. The attributes 204 characterizing the media may further comprise information characterizing the media beyond the minimum permissible content 206. For example, the attributes 204 characterizing the media may contain information about people involved with the media who are not owed royalties, which could include a variety of people like recording engineers or writers who were paid upfront and are not owed a royalty but are given attribution for their work on the media, or about further people involved with the media who are owed royalties but are not required in the minimum permissible content which could include managers and service providers who might get a "cut" in the song but may not be present in all scenarios and are thus not required to be listed.

The transaction record 208 may comprise a record of any or all interactions with the information 200. Such interactions may comprise adding information, removing information, updating information, or merging of records. The information stored in the transaction record may include information identifying the party executing the interaction and information describing the interaction, for example. The information identifying the party may include information identifying a person and/or a user account with the distributed data store of a person. Additionally or alternatively, an entity (e.g., a PRO, recording label, music streaming service) may be a party or may be affiliated with (e.g., the employer of) a party, and may be identified in the transaction record. The information identifying a user account may be a unique identifier for the user account assigned to the user account by the data store, a user name, or other information. Information identifying a person may include a name, address, email address, social media account, or other information that may be used to uniquely identify the person. The information describing the interaction may include information identifying what information was read out of or written to a record for media content, in the case an interaction was with the record, or what was done (e.g., playback, editing) with music data if the interaction was with the music data (or other media data). The information describing the interaction, including identifying the party and describing the interaction, may aid in demonstrating reliability of a media content record, as this information may be consulted to determine an origin of each piece of information in a record and to determine how the record has changed over time. In some embodiments, a time stamp identifying a time or an interaction, or a time at which the data store received a notification of the interaction. In some embodiments, a unique identifier may be generated for each interaction and stored in the transaction record. In some embodiments, an interaction may include two or more parties. In such an instance, the transaction record may record the identities of the included parties, and optionally also record their roles within the transaction.

The reliability score 210 may be one or more values corresponding to an indication of the reliability of the information 200 regarding the media content. The reliability score 210 may be determined from an analysis of the record for the media content, including according to analyses described herein. For example, the reliability score 210 may be based on the number of attributes stored in the attributes 204 characterizing the media. In some embodiments, the reliability score 210 may be based on the reliability scores of individual user identified in connection with interactions in the transaction record 208. In some embodiments, the reliability score 210 may be based on the number of conflicting records stored in the transaction 208. It should be appreciated that these are given merely as examples, and in some embodiments the reliability score 210 may be based on any combination of, or none of, those factors.

In some embodiments, a file wrapper may be associated with a record on the blockchain. The file wrapper may include any or all of the information regarding media content 200, and may be used as a local version of the information for a user of the blockchain such as the file wrapper described briefly above in connection with FIG. 1. For example, a user desiring to play a song stored on the blockchain may download the file wrapper from the blockchain. In such an example, the file wrapper may contain the link to the media data 200 as well as any of the attributes characterizing the media 204, such as the title and artist of the song, or cover art for the song, so that the user may play back the song. Additionally, the file wrapper may contain any DRE information associated with the media data, to aid the user's playback device or system in determining rights allocation. The file wrapper's link to the media data may be any indication of a storage location of the media data or song, such as a pointer to an address in memory, a URL, a blockchain address, or the media data itself. The file wrapper may also contain any or all of the transaction record 208 and/or the reliability score 210, which the user may in some embodiments use to verify the reliability of the information within the file wrapper. In some embodiments, a user may download a file wrapper from the blockchain, corresponding to one or more records in the blockchain. In some embodiments, a user may create a file wrapper for a media content and upload it to the blockchain to create a new record on the blockchain or modify an existing record on the blockchain, as will be explained in further detail below. Additionally, in some embodiments a file wrapper may synchronize its information with the blockchain, so that the information within the file wrapper may be kept up to date with any changes in the corresponding record on the blockchain. It should be appreciated that while the discussion above is in the single blockchain, the file wrapper may contain information from multiple blockchains, such as a private blockchain and a public blockchain as described above.

In some embodiments, the process may be performed by a cloud gateway. An uploading system that may be used in some embodiments may be a cloud gateway that acts as interface between the user and the blockchain. The cloud gateway may receive input from a user and, responsive to that input, perform updates, to the blockchain by writing input data to the blockchain or read data from the blockchain. The cloud gateway may translate actions from, or requests by, the user into operations on the blockchain. For example, the user uploading media content to the cloud gateway may be translated by the cloud gateway into any of the steps detailed below. By having a cloud gateway between the user and the blockchain, the user may interact with the cloud gateway in a consistent manner regardless of the nature of the blockchain behind the gateway. Such a gateway allows for interaction with multiple blockchains or multiple types of blockchains. For example, the user could upload new music content to the cloud gateway, and the gateway may trigger the addition of a new record to the blockchain regardless of whether the blockchain is implemented through Ethereum, Bitcoin, or any other system. Additionally, the cloud gateway may act as a batch import system. For example, if a PRO wanted to add an entire music library to a blockchain, the cloud gateway may pull the information from the music library, as described below, and create corresponding new records on the blockchain. The cloud gateway may also send and receive notifications caused by tagging and creating claims, as will be described in further detail below. For example, if a new song that is uploaded to the cloud gateway by a PRO has an artist tagged by the PRO, the cloud gateway may issue a notification to the artist alerting them of the tag.

Figure 3:
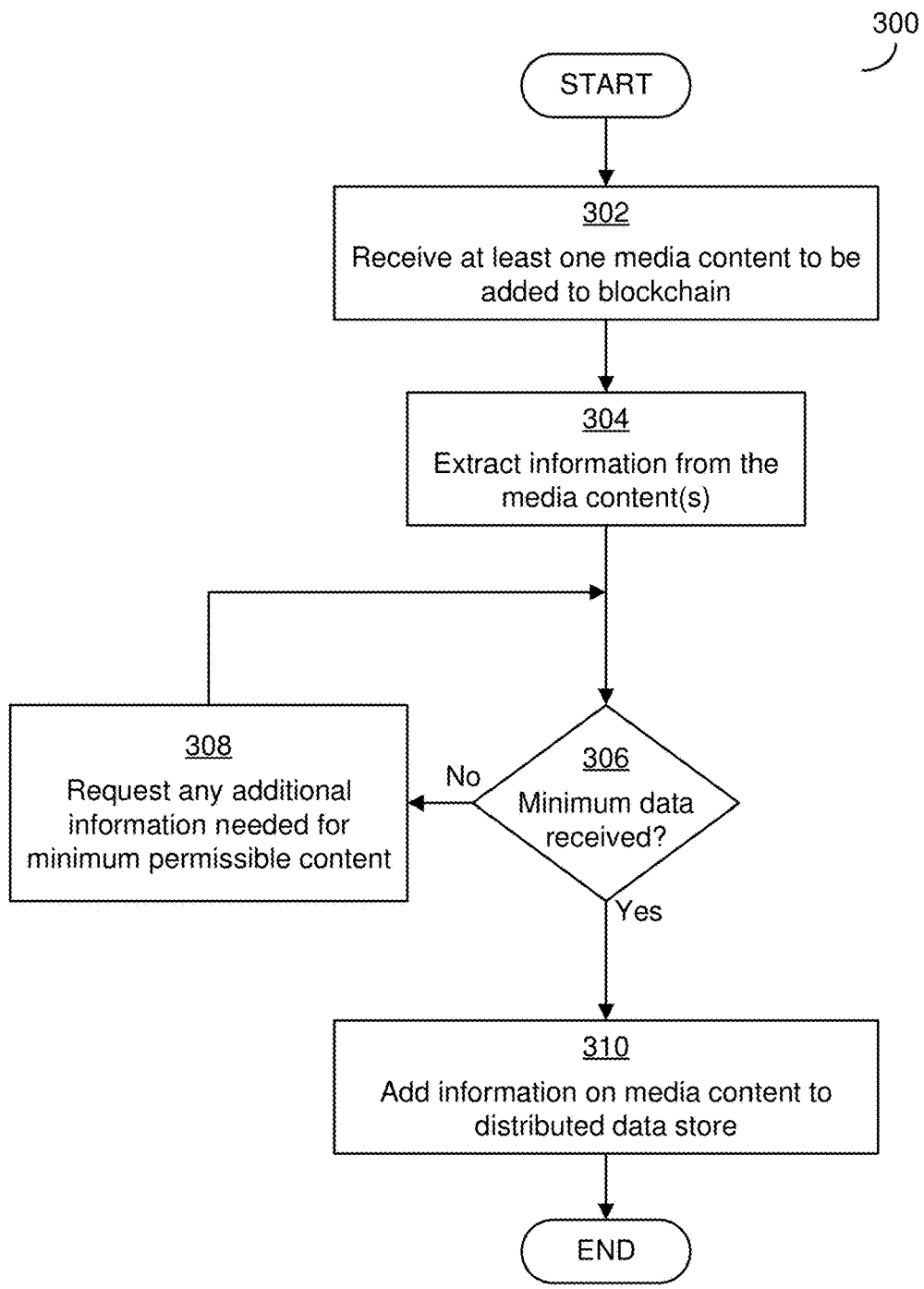
FIG. 3 is a flowchart of an illustrative process for adding information regarding a media to a distributed data store, which may be implemented in some embodiments.
Figure 4:
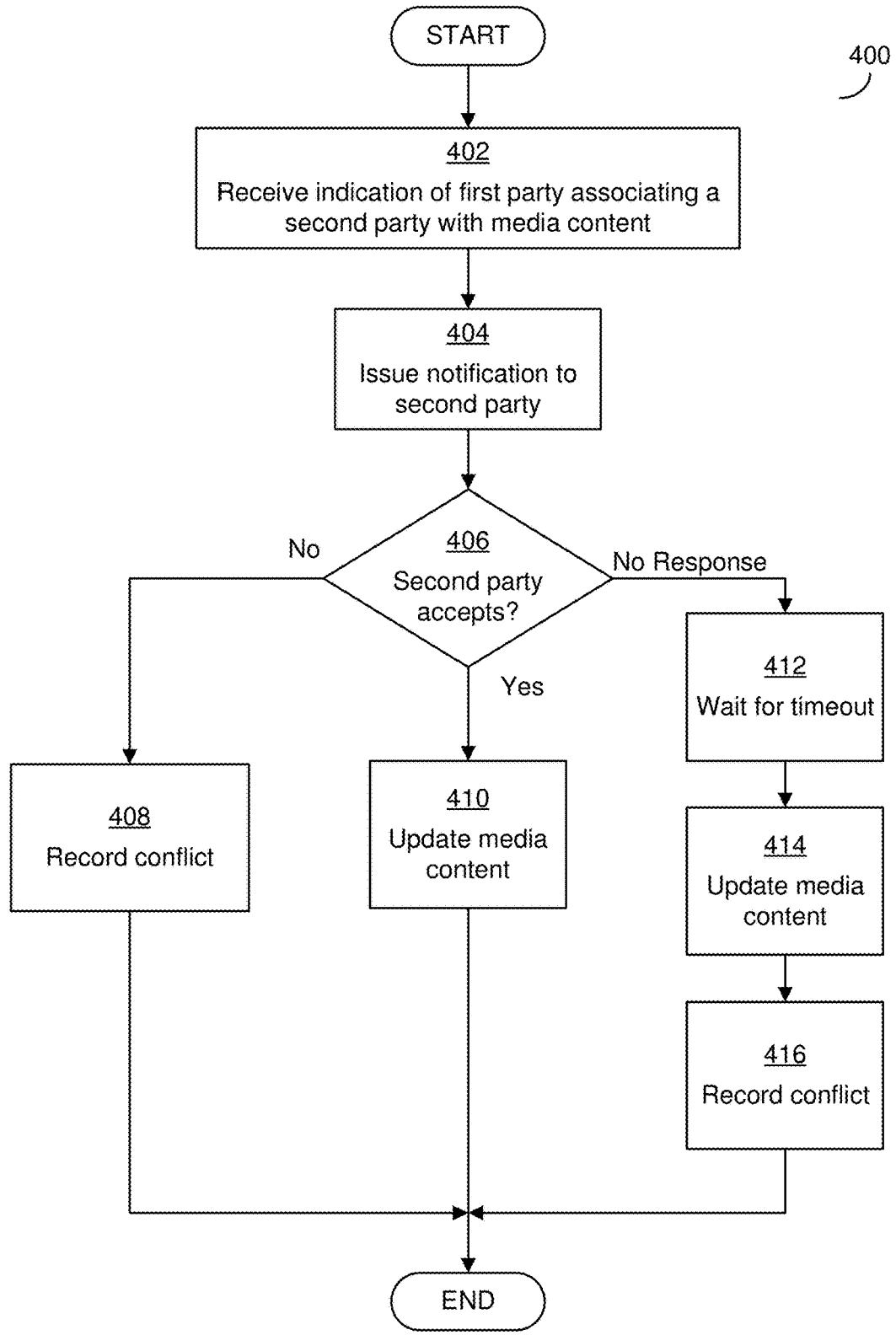
FIG. 4 is a flowchart of an illustrative process for updating a distributed data store based on a user's response to being associated with media, which may be implemented in some embodiments.

FIG. 3 is a flowchart of an illustrative method 300 for adding information regarding a media to a distributed data store. The method 300 may be performed by an ingestion facility executing on a device such as the music workstation or end user device of FIG. 1, for example. Once a new song is recorded or otherwise created (e.g., through editing, or once song data is otherwise received as input, the song and its associated information (for example the title, artist, DRE, or any other information in the minimum permissible content) may be added to the distributed data store from the music workstation. In another example, the method 300 may be performed by an ingestion facility on the PRO device of FIG. 1 when the PRO seeks to create a record on the distributed data store for a song or other media content for which rights are managed by the PRO.

The method 300 may begin at step 302. In step 302, the system may receive at least one media content to be added to the blockchain. The media content may comprise a media file, such as a song or image, and/or information about the media file, such as information characterizing a song, for example, may include identifying information for the song, such as a title of the song, as well as information identifying an interest in the song, such as an artist.

In step 304, the system may extract information from the at least one media content. In some embodiments, the system may attempt to extract information relating to the minimum permissible content for a record on the blockchain. For example, the system may attempt to extract information relating to the title of the song, the artist of the song, the record label for the song, and any other parameters in the minimum permissible characterization. The system may also extract information not required by the minimum permissible content, or may extract other information provided in the media content. Extracting information may include searching the file for a song, or a music library, or information maintained by a music workstation for metadata about the song. Depending on the nature of the source of metadata from which the data is being extracted, the extraction may take different forms. For example, if the information is being extracted from a file for the song, such as a conventional MP3 file, the extraction may involve extracting the information from data fields within the file that include song attribute information, such as IDS3 fields for an MP3 file. If the metadata source is a library, a catalog file for the library or other listing of song attribute information may be queried. In some embodiments, a data service, such as one hosted on the web, may be used to extract song attribute information. For example, the song data may be used to generate a "fingerprint" for the song using known techniques, or some attribute information may be extracted, and the fingerprint or attributes may be used to query a service.

In step 306, the system may verify that the data extracted satisfies the minimum permissible characterization; that is, every field in the minimum permissible characterization may be filled with corresponding information. If the minimum data is received, the system may proceed to step 310. In step 310, the system may add information on the media content to the distributed data store. Adding information on the media content to the distributed data store may include, creating a record for the media content on the distributed data store. The record that is created may include the song attributes of the minimum permissible characterization, and may additionally include a unique identifier for the media content. The unique identifier may be generated in any suitable manner, as embodiments are not limited in this respect. For example, the ingestion facility may generate a unique identifier (which may be a pseudo-unique identifier) using a process identified and configured for the blockchain, or may be generated upon request by a service associated with the blockchain using such a process and supplied to the ingestion facility. In some embodiments, such a unique identifier may be one element of a minimum permissible characterization for a blockchain.

In some embodiments, as discussed above, a record may include—and a minimum permissible characterization may include—music data for the song or an identifier (e.g., an address such as URI or URL) for a source of the music data. The source of the music data may be a music service such as Spotify®, SoundCloud®, Apple Music®, or other service, and the identifier may be for a manner in which the song data may be retrieved, such as a web location at which the data is stored and accessible.

In some embodiments, a record may also include a transaction record for the song, which as discussed above may include a history of interactions with the record. In embodiments that include such a transaction record, and in which a transaction record is created when a song record is created, the transaction record may store information describing the creation of the song record, such as identifying a person or entity who created the record and a time at which the record was created. In some embodiments, the transaction record may be created when a first transaction occurs involving the record after the creation of the record.

In some embodiments, the record may also include a reliability score for the record. Examples of techniques for generating a reliability score are discussed below such a technique may be used to create a score and add it to the record, when the record is created.

If it is determined in block 306 that the minimum data is not received, the system may proceed to step 308. In step 308, the system may request any additional information needed for the minimum permissible characterization. For example, if a user attempts to upload a song, but omits the title of the song and the minimum permissible characterization requires a title for the song, the system may prompt the user to provide a title for the song. The request may take any suitable form, such as a prompt to the user, an electronic message sent to the user alerting them that the record is incomplete, or a request through an API for more information, for example. In some embodiments, the system may not provide a further request for additional information, and may simply terminate the upload of information. In some embodiments, the system may request additional information needed for the minimum permissible content if information was received but was determined to not be sufficient for the minimum permissible content. For example, if the minimum permissible content requires a publisher for the song, and the system extracts or receives information about the publisher but does not recognize the name of the publisher, by comparing it to a list of known publishers, for example, the system may request additional information about the publisher.

When a record is created in this manner, in many cases one user may identify in a record that another user is associated with a song (or other media), such as when an artist is identified as a performer for a song.

This association may be referred to herein as "tagging." In some embodiments, when a first party "tags" a second party in a record the second party may then receive a notification of the tag and be prompted to respond. The second party may accept, decline, or ignore the tag. Such a system of tagging and notifications may be helpful in some embodiments, as part of helping increase reliability or helping to demonstrate reliability of data in the records. As discussed above, an operator of the distributed data store may not assume responsibility for accuracy or completeness of the records, but may instead devolve that responsibility to users. A system of notifications may help with reliability, by permitting any user to tag any other user but also prompting that user to approve or reject the tag. This may aid in increasing reliability of originally-input data, to help suppress false data input to the system. It is possible a user may also falsely, or incorrectly, accept or reject a tag. In some embodiments, this second source of potentially-incorrect information is addressed with a transaction record for each song record (or record for other media). As discussed above, a second party may accept, decline/reject, or ignore a tag. Regardless of the option taken, the decision made by the artist may be recorded in to the transaction record of the media content on the blockchain, along with the original tag. Since, as described above, the blockchain does not assume responsibility for the accuracy of the stored information, maintaining a record of each tag (the identity of the issuing party, the identity of the responding party, and the response to the tag) may aid in demonstrating to a user, or enable a user to reach an independent conclusion of, the reliability of the information stored on the blockchain. When all tags for a song have been accepted, the song data may appear to be more reliable. When the transaction record shows a lot of rejected tags, the data may appear less reliable. The number of declined tags may, as discussed below, influence a trust score for a record on the blockchain, and the number of tags issued by a user that are then declined or even ignored may influence the trust score for that user, as will be described in greater detail below.

In some embodiments, a second party that receives a tag for a record may accept the tag but record in the blockchain an identity of a third party that is to take responsibility for future interactions with the blockchain regarding the second party's role as specified in the record. For example, an artist may be tagged in a song record by a studio engineer. The artist may accept the tag as correct, and the blockchain may record the acceptance of the tag as described below. The artist may update the blockchain to record (in connection with a profile of the artist on the blockchain, or in connection with a song record in which the artist was tagged) that a manager, PRO, producer or other party is to be contacted regarding the artist's role in the music. Future contacts may include identifications of royalty amounts due to the artist in connection with performances or sales of the song, or questions about whether the song may be sampled, covered, or otherwise used in producing another song. To identify a third party as the contact point for such future contacts, the second party may add to the blockchain information identifying the third party and/or identifying a manner in which to contact the third party, examples of which information are discussed elsewhere herein.

Method 400 is an example of a process for notifying a party in response to a tag, and prompting the party to respond. The process may be implemented by a facility related to the blockchain, such as by a service executing on a server hosting at least a part of the blockchain or on a device (e.g., device 103, 104, 106 of FIG. 1) that has access to or hosts at least a part of the blockchain. The method 400 may begin with step 402. In step 402, an attribute update facility may receive an indication of a first party associating a second party with a media content. The indication may be received by the attribute update facility direct from the ingestion facility that initially created the record that includes the tag, which may be execution on the same device as the attribute update facility (or even another component of the same application as the attribute update facility). The indication may also be received in the form of receiving the tag initially, such as in a case that the attribute update facility includes functionality to make discrete changes to a record for a media content on the blockchain, such as by adding an attribute not previously included in the record, or charging a value for an attribute, or other charge. The indication may also be received, in some embodiments, through a blockchain functionality, such as a synchronization process that sends a charge made to a record from the device that made the charge to other devices. That charge may include a tag, and may be an indication of a tag. In step 404, the attribute update facility may issue a notification of the tag to the second party. In some embodiments, the system may obtain a method of or means for contacting the second party by consulting the blockchain. For example, the blockchain may store an email address for an artist associated with a song, and the system may contact the artist through the email address if another user attempts to modify or delete the artist's tag on the song. In some embodiments, the system may query a profile of the second party, on the blockchain or within the PRO, for example, to determine contact information for the second party. In other embodiments, if the second party is not yet a user of the system, the system may prompt the first party for a means of contacting the second party. If the first party provides the means for contacting the second party, a corresponding note may be made in the transaction record indicating that the first party provided the contact information for the second party. In some cases, notifying the second party may include notifying a representative of the second party, such as a PRO or manager, that the second party has designated (e.g., with a record in the database) is to receive and process notifications for the second party.

The notification may take any suitable form of notification. For example, the system may send an e-mail or a short message service (SMS) message to the second party, alerting them of the association with the media content. The system may also or alternatively alert the second party through a social media account that the second party has linked to the system. The notification may trigger a prompt to the second party to accept or decline the association, or may provide instructions for the second party to respond to the notification. The notification may, for example, include a URL for a web page for the second party to access, which may include the prompt to the second party. The notification may additionally or alternatively be directed to and received by a program that is operated by the second party to interact with the blockchain, such as a music player that reads DRE information as part of playing music. Such a program may be configured to, in response to the notification, prompt the second party to accept or reject the tag, and the second party may accept or reject, or ignore the prompt.

In step 406, the system may obtain an indication of the second party's response to the notification. If the second party declines the association, the system may proceed to step 408. In step 408, the system may record a conflict in the transaction record for the media content. Recording a conflict may comprise creating an entry in the transaction record including an identity of the first party, an identity of the second party, and record of the declination of the association. In some embodiments, recording the conflict may comprise issuing a request or update to the blockchain indicating that the second party declined the association. Recording the conflict—that is, a conflict between the original tag and the decline (where a decline at least indicates that the original tag may have been incorrect)—rather than deleting the original tag may stem from the approach to reliability in some embodiments. Because the operator of the blockchain is not centralizing responsibility for the reliability of the data, it may be valuable for the blockchain not to accept either the initial tag or the rejection of the tag as "true." Instead, the blockchain may store both the tag and the rejection, and make both publicly visible. A query for a "current" status of the record may not include the tag, following the rejection, but the transaction record may list both the tag and the rejection.

If the second party accepts the association, the system may proceed to step 410. In step 410, the system may update the media content. Updating the media content may comprise recording the identity of the second party and the information associated with them (e.g., recording the name of the artist and labeling them as the artist for the media content). In some embodiments, the identity of the first party and the information associated with them may also be recorded and associated with the tag of the second party. In some embodiments, updating the media content may comprise issuing a request or update to the blockchain representing the second party's acceptance of the association. In some embodiments, the system may further record in the transaction record that the second party accepted the association from the first party.

If the system receives no indication that the second party has either accepted or declined the association after a certain amount of time (for example 1 day, or 1 week, or 1 month) in step 412, the system may proceed to steps 414 and 416. The amount of time before proceeding may be set by the first party, for the tag or tags entered by the first party, may be set by the second party for tags listing the second party or for users managed by the second party, may be a fixed constant in the blockchain set by an administrator, or set in any other way. The system may record the time interval used in the transaction record on the blockchain or within the media content on the blockchain, for example. Alternatively, the time interval may be sent to the second party along with the notification. The first party's or second party's system, such as an application (e.g., the attribute update facility) designed to interface with the blockchain, or another component of the system such as a server managing a part of the blockchain, may automatically alert the attribute update facility after the time interval if no response from the second party has been recorded. In step 414, the media content may be updated, as described in step 410. In step 416, a conflict may be recorded as in step 408, except that the entry created in the transaction record may reflect that no response was received from the second party rather than that the tag was rejected.

In some embodiments, the conflict may be recorded or the media content may not be updated, as set by an administrator.

In some embodiments, a tagging hierarchy may be used. The hierarchy may establish requirements necessary for a first party to be able to tag a second party. In some embodiments, the requirements may restrict the ability of the first party to tag a second party that does not fall within the first party's portion of the hierarchy. The hierarchy may relate to roles within the music industry, such as job roles within the industry, or to a particular corporation or record label and artists signed to test label or employees of the corporation. For example, a hierarchy may be established that allows a second party with a second portion of the rights to a set of media content to only be tagged by a first party with a first, larger portion of the rights to the media content. For example, a record label may tag a recording engineer, but a recording engineer may not tag a record label. As another example, a hierarchy may be established that allows a second party to be tagged by a first party only if the second party falls below the first party in a corporate structure (e.g., a record label executive may tag a producer, but a producer may not tag a record label executive).

In some embodiments, the tagging hierarchy may vary depending on a trust score of a user within the blockchain. In some embodiments, the tagging hierarchy may vary depending on the trust score of the media content. The tagging hierarchy may aid in storing reliable information on the blockchain, as it may prevent unwanted parties or malicious parties from making incorrect tags or attempting to 'steal' credit for content by tagging themselves in it. Since the blockchain cannot independently verify information stored within it, as would be expected of a centralized rights authority, the tagging hierarchy may demonstrate the reliability of the stored information.

In some embodiments, a token system may be used to regulate tagging. A token may correspond to a user's ability to make a modification to the blockchain. Each interaction with the blockchain may "spend" a token. For example, uploading a new media content to the blockchain may require a token, or modifying an existing media content on the blockchain may require a token. Users may be granted a fixed number of tokens when their account is first created. In some embodiments, a user may "spend" a token when making a claim, such as tagging a party in a media content or uploading a new media content. When a user runs out of tokens, the user may be precluded from making more claims, which may have an effect of suppressing low quality data. However, in some such embodiments, high quality data may still be accepted. In some such embodiments, a user may recover spent tokens when a claim made by the user is verified by another user or party such as the tagged party. The user may also earn tokens by confirming or rejecting a tag entered by another user. The token system may aid in combatting spam on the blockchain, or people attempting to upload large media libraries and improperly tagging themselves in the media content. It should be appreciated that not all claims may require a token in some embodiments, and the number of tokens given to a user may vary by user or by embodiment. It should also be appreciated that, in some embodiments, users may not be able to recover tokens. Similarly to the tagging hierarchy, the token system may demonstrate the reliability of the information stored on the blockchain. The token system may deter unwanted or malicious users from making needless incorrect tags, or attempting to tag themselves or another party in a disproportionate number of records. A centralized rights authority would be required to take responsibility for ensuring the completeness of the data and ensuring the accuracy of the data, but in the distributed data store the token store may be paired with any of the features described above to help maintain the reliability of the data along with transparency of the source of the data.

In some embodiments, as part of demonstrating reliability of data in the blockchain, the blockchain may not only expose underlying data and a history of interactions as discussed above, but may also calculate a metric that is indicative of and a summary of that data. The metric may indicate a reliability or trustworthiness of the data. In some embodiments, two such metrics may be calculated: a trust score for a user and a trust score for a media content.

Figure 5:
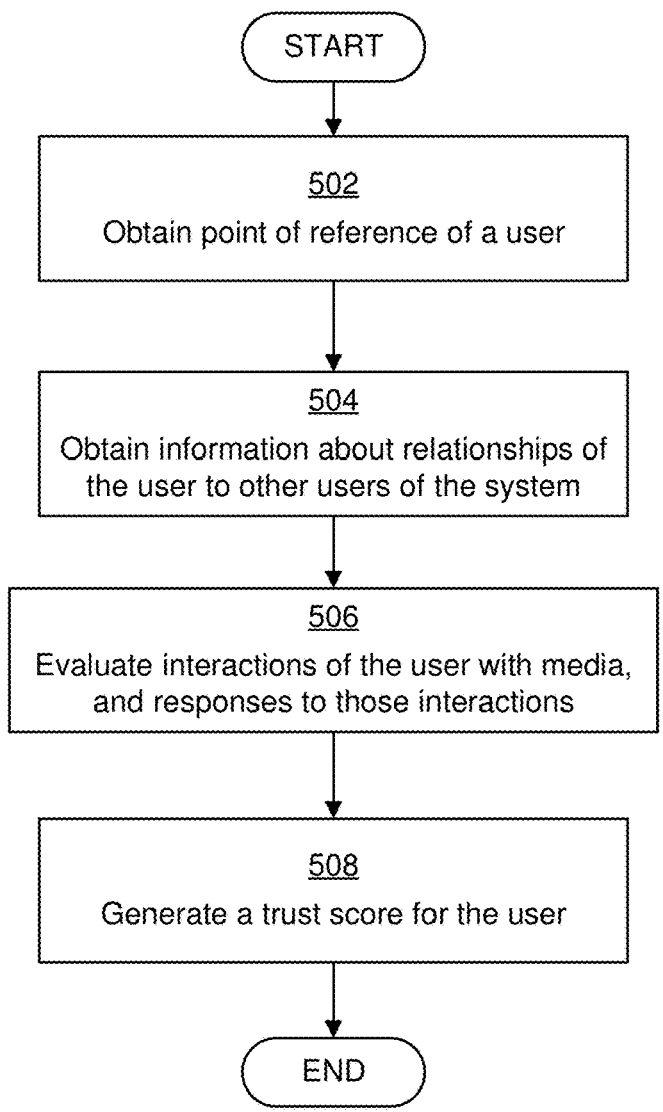
FIG. 5 is a flowchart of an illustrative process for calculating a score indicating a reliability of a user in the system, which may be implemented in some embodiments.

FIG. 5 is a flowchart of an illustrative method 500 for calculating a trust score indicating a reliability of a user in the system. The method 500 may be performed by a score facility executing on a cloud gateway between a user and the blockchain or by another device interacting with the blockchain. For example, the PRO device shown in FIG. 1 may be used to determine the score for users associated with a blockchain record that is of interest to the PRO. The PRO may use the scores to determine whether or not to accept a tag by another party, for example, or to resolve a conflict in the transaction history of a blockchain record associated with the PRO. In another example, the blockchain may generate a score for each user tagged in a media content in the blockchain or each user logged in a transaction record for a media content on the blockchain, to provide additional transparency to another party examining or working with the media content on the blockchain. In another example, the cloud gateway used by a party to add information to or modify information on the blockchain may assign a score to that user as well as other parties that the user interacts with through tagging.

The method 500 may begin with the facility obtaining a point of reference of a user in step 502. The point of reference of a user may be any suitable information establishing the identity of the user in a manner that may verify a user's claim to an identity outside the blockchain, in the real world. For example, the point of reference may be a social media account of the user, credit card information for the user, or information verifying the employment of a user. Such information may be input by the user, and may be used by the system to confirm an identity claimed by a user. For example, an identity (e.g., a name, an employer) associated with a social media account or a financial account may be compared to an identity (e.g., a name, an employer) asserted by a user, to determine whether there is a match. Accordingly, in some embodiments, a social media profile, a financial account, and/or an employer email address may be used to confirm an identity asserted by a particular user. In some embodiments, the point of reference may be a tag of the user by a second, verified user. In some embodiments, multiple points of reference may be obtained for a user. The system may obtain the point of reference through the user's account within the system, or through a record of the user in the blockchain, for example. A PRO may use an employee's company email address as a point of reference when generating a score for the employee, for example, through the PRO's internal company logs. In another example, a cloud gateway may retrieve social media information used by a user of the cloud gateway to create an account within the cloud gateway. In some embodiments, as part of obtaining the point of reference the facility may validate the point of reference. For example, the facility may validate credit card information or validate a corporate email address, or perform other suitable validation.

In step 504, the system may obtain information about relationships of the user to other users of the blockchain. Relationships between users may comprise any tags between the users, social media links if the point of reference includes a social media account, or any other tie between users that the system may access. In some embodiments, the relationship may be an employment relationship, for example the system may obtain information that the user, for example a sound engineer, works for a second user, for example a recording studio. In some embodiments, the relationship information may be obtained from an external third party authentication service. For example, a social network external to the distributed data store could provide a verification of a connection between two users.

The system may collect this information on links to other users because, in some embodiments, a user with more professional or even social relationships to other users may be more trusted than one with fewer or no connections.

In step 506, the system may obtain information about interactions of the user with one or more media content and subsequent responses to those interactions. For example, the system may evaluate the number of tags a user has made, and further evaluate how many of those tags were accepted by the tagged party. In some embodiments, the system may evaluate how much additional information the user has provided for a media content, and/or evaluate if any of that additional information has been subsequently modified by another user. This information may be useful in calculating the reliability score because a user whose contributions are often overruled may be less trustworthy than one whose contributions are approved by other users.

In step 508, the system may generate a trust score for the user. The trust score may be a value representing the trustworthiness of the user within the system, and may be updated or modified over time. The system may utilize any of the above listed information to generate the trust score, by weighting the information. For example, a number of connections may be assigned one weight and numbers of claims accepted or rejected may be given other weights.

Figure 6:
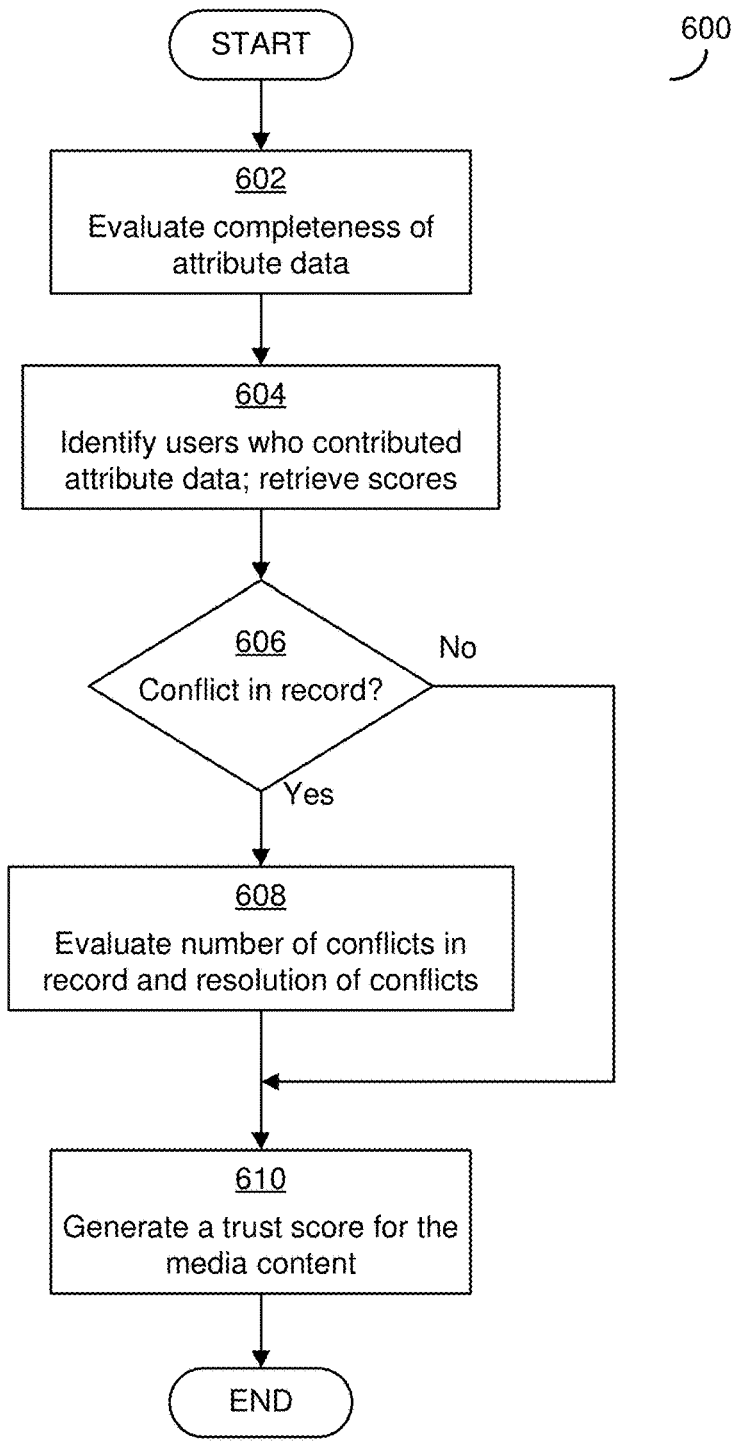
FIG. 6 is a flowchart of an illustrative process for calculating a score indicating a reliability of data regarding media, which may be implemented in some embodiments.

FIG. 6 is a flowchart of an illustrative method 600 for calculating a score indicating a reliability of data regarding a media content. The method 600 may be performed by a score facility executing on the blockchain, by a cloud gateway between a user and the blockchain, or by another device interacting with the blockchain. For example, the PRO device shown in FIG. 1 may be used to determine the score for a blockchain record that is of interest to the PRO. The PRO may use the score to determine whether or not to use the DRE information or royalty information associated with the record when determining royalty payments. In another example, the blockchain may generate a score for each blockchain record, to provide additional transparency to another party examining or working with the media content on the blockchain. In another example, the cloud gateway used by a party to add information to or modify information on the blockchain may assign a score to each record added to the blockchain by analyzing the information associated with the media content, as will be explained in further detail below. The method 600 may begin with the facility evaluating the completeness of the attribute data in step 602. In some embodiments, the system may evaluate the completeness of the minimum permissible content, by ensuring that every requirement in the minimum permissible content is satisfied, and/or by evaluating how much additional attributes outside of the minimum permissible content are stored in the attributes characterizing the media. For example, in the case of creating a score for the song when the song is first uploaded to the blockchain, the ingestion engine or cloud gateway may evaluate how much information beyond the minimum permissible content is provided, or how complete the minimum permissible content is, when creating the song score. In another example, the blockchain may evaluate a record on the blockchain by determining how much attribute data is provided beyond just the minimum permissible content in the record.

In step 604, the system may identify one or more users who contributed information to the attributes characterizing the media, through the transaction record of the media content. The system may further obtain the trust scores of the one or more users. In one example, the blockchain may use the transaction record to identify all the parties associated with a blockchain record for a media content, as well as any tags associated with the media content. In another example, an ingestion engine or cloud gateway may use any tags associated with the imported or uploaded media content to identify all the parties associated with the media content, as well as the identity of the person or party performing the uploading. The trust scores for the one or more users may be calculated by the system as described above, may be pulled from a database of system users, or may be retrieved from information stored on the blockchain about the users, for example.

In step 606, the system may check if there are any conflicts recorded in the transaction record for the media content. If there are, the system may proceed to step 608. In step 608, the system may evaluate the number of conflicts recorded in the transaction record and/or check if any or all of the conflicts are indicated as having been resolved.

In step 610, the system may generate a trust score for the media content. The trust score may be a value representing the trustworthiness of the information stored on the blockchain regarding the media content, and may be updated or modified over time. The system may utilize any of the above listed information to generate the trust score, with any suitable weighting of the information. For example, if there are numerous unresolved conflicts in the transaction record and the trust score of the users who entered the attribute information is low, the trust score for the media content may be relatively low. If there are no conflicts in the transaction record and the attribute data is complete, the trust score for the media content may be relatively high.

The trust scores discussed above may be generated and stored in different ways in different embodiments. In some embodiments, the scores may be calculated and added to a record for a user or a song on the blockchain, and may be retrieved from the blockchain. In other embodiments, in addition to or as an alternative to the data being stored in the blockchain, the underlying data for the score may be available through the blockchain for any user or other entity to dynamically calculate the score when added.

As discussed above, the information in the blockchain may be used to indicate a reliability of data for a media content on the blockchain. This reliability may be used in different ways. In some embodiments, the determination of reliability may be made as part of determining whether to play an input song or other media, such as by determining whether the media that is to be played is appropriately configured, with the blockchain, to ensure fair and full compensation is rendered to the artists or other rightsholders.

Figure 7:
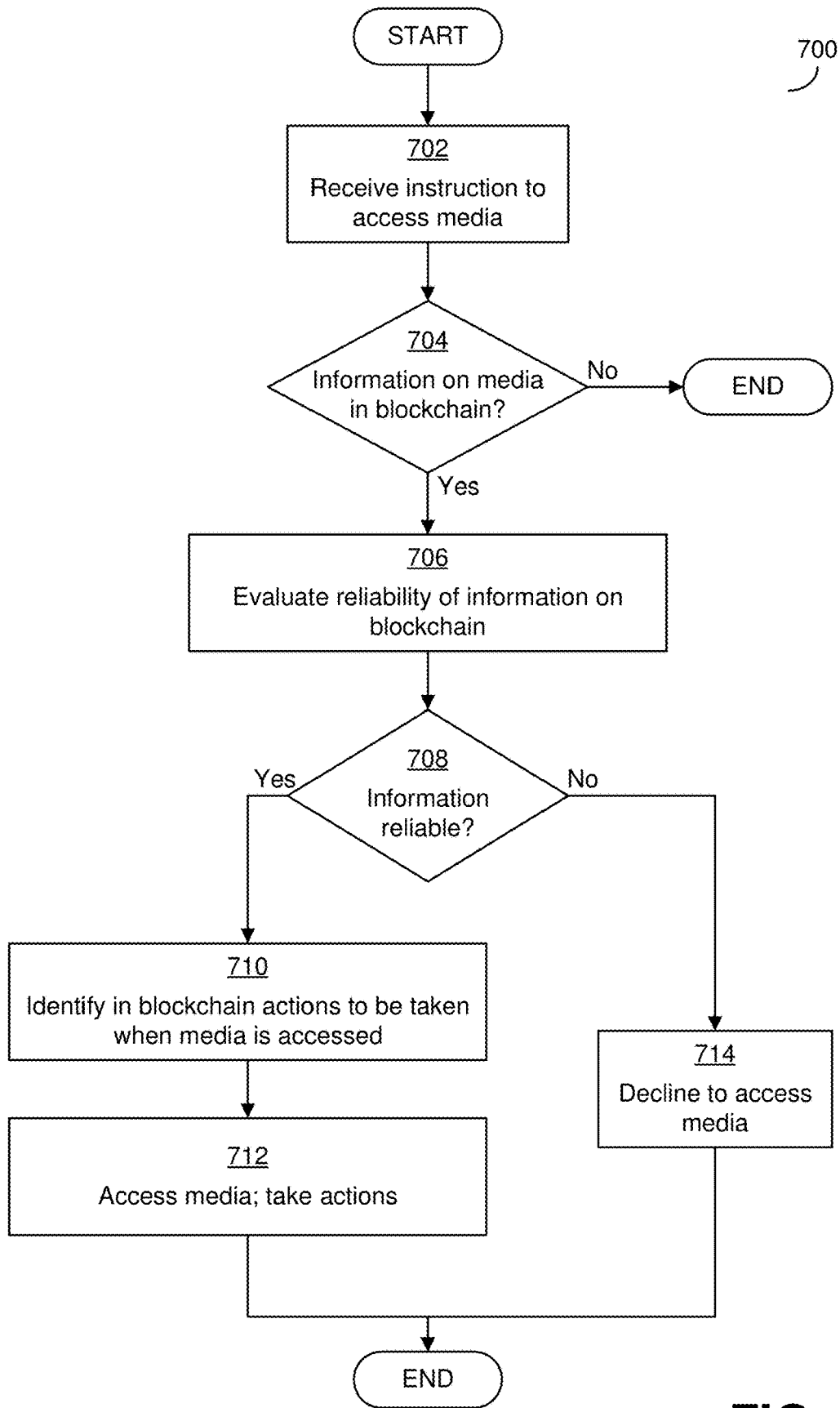
FIG. 7 is a flowchart of an illustrative process for determining whether and how to access a media, which may be implemented in some embodiments.

FIG. 7 is a flowchart of an illustrative method 700 for determining whether and how to access a media. The method 700 may be performed by a device (e.g., device 106 of FIG. 1) operated by a user that is seeking to play or otherwise access a song or other media. For example, a consumer device may be configured only to play music that will appropriately compensate artists. As another example, a music streaming service, such as SoundCloud® or Spotify® may only authorize upload and playback of music for which it can properly pay royalties. The method of FIG. 7 may help ensure that the appropriate parties receive royalties or credit when the song is played, for example, and help ensure that incorrect information is not shared between users if the first user were to share the song downloaded from the blockchain with another user.

The method 700 may begin by receiving an instruction to access media content in step 702. For example, the device or service may receive a file wrapper with an instruction to play the song to which the wrapper relates. As another example, the system may receive a request from a music player to download a song stored on the blockchain, or a request to access royalty payment information for a song stored on the blockchain.

In step 704, the system may verify that information on the media content is stored in the blockchain. If it is not, and/or the system does not have access to it, the method may end, for example by providing a response to the system that provided the instruction and/or by terminating the request. If the system verifies that the media content is stored on the blockchain, meaning that information regarding the media content exists on the blockchain, such as finding a unique identifier corresponding to the media content on the blockchain, the system may proceed to step 706.

In step 706, the system may evaluate the reliability of information regarding the media content on the blockchain. Evaluating the reliability of information may comprise accessing the trust score for the media content, updating the trust score for the media content, or creating a trust score for the media content. This may also include retrieving data stored in the blockchain or in a file wrapper to determine if criteria are met, such as whether more than the minimum permissible characterization is stored, or if a particular attribute is stored. For example, a determination may be made of whether a royalty payment action is fully specified.

In step 708, the system may compare the trust score for the media content to a threshold value, or otherwise make a determination of the reliability of the information regarding the media content based on a result of the evaluating of block 706. If the information is deemed unreliable, for example if the trust score falls below the threshold value, the system may decline providing access to the media content. If the information is deemed reliable, for example if the trust score falls above the threshold value, the system may proceed to step 710.

In step 710, the system may identify from the blockchain, or a file storing blockchain information, action to be taken when the media is accessed, based on the instructions received to access the media. For example, if the instruction received is to access royalty information, the system may identify the corresponding royalty information for the media content in the attributes characterizing the media. The royalty information may include an identification of a party to notify of a royalty-triggering event (e.g., a PRO), an amount to pay, and/or an identification or what events trigger a royalty.

In step 712, the system may access the media content on the blockchain, or access the information regarding the media content on the blockchain. For example, the system may retrieve the royalty information for the media content and provide it to the system that issued the instruction, or the system may provide a means for the system that issued the instruction to access the media data corresponding to the media content. The system may also take the action specified by the blockchain, such as notifying a party of a royalty triggering event and/or sending or recording a royalty payment.

Techniques operating according to the principles described herein may be implemented in any suitable manner. Included in the discussion above are a series of flow charts showing the steps and acts of various processes that operate a distributed data storage system for media content. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 806 of FIG. 8 described below (i.e., as a portion of a computing device 800) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 8:
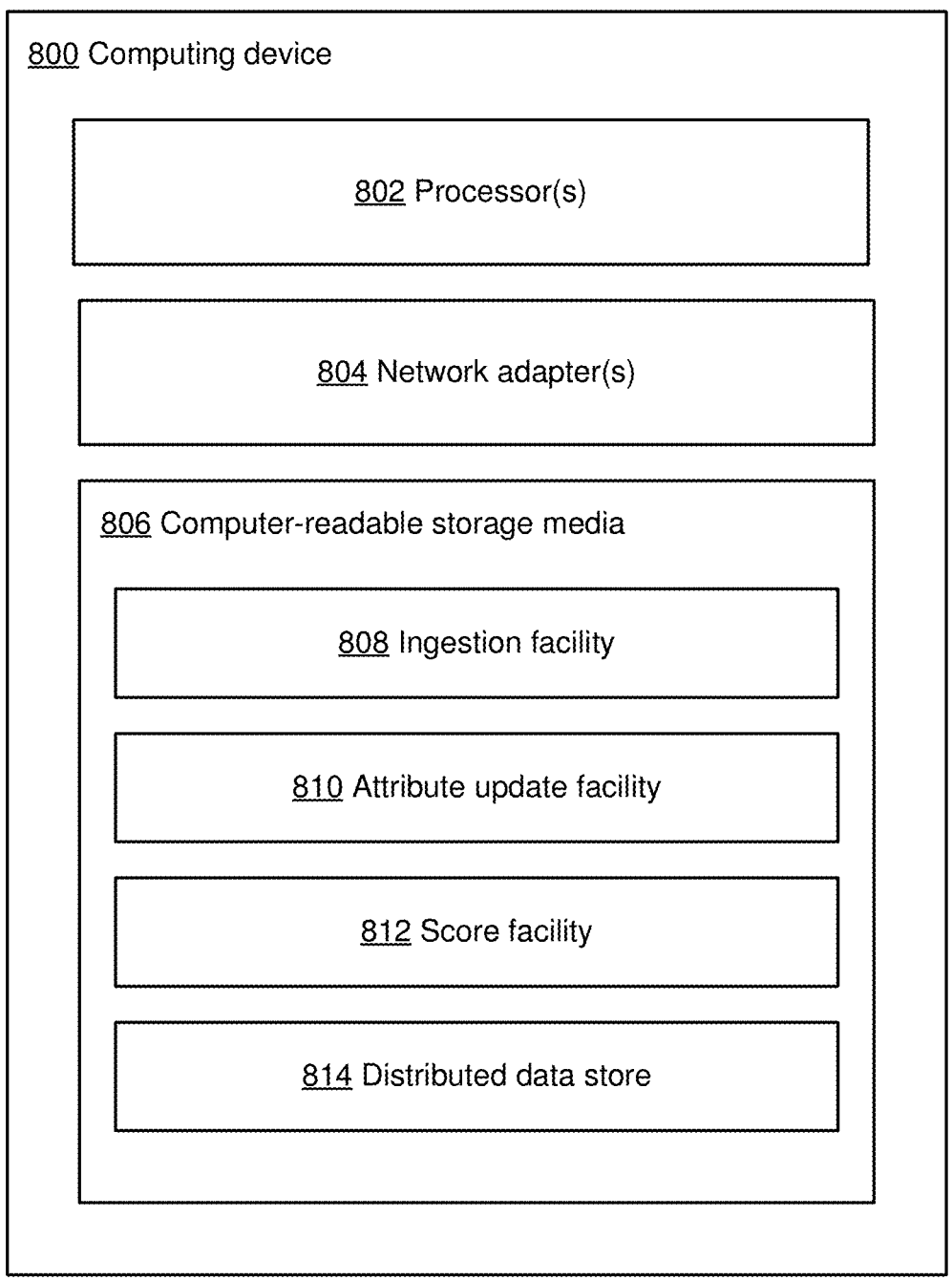
FIG. 8 is a block diagram of a computing device with which some embodiments may operate.

FIG. 8 illustrates one exemplary implementation of a computing device in the form of a computing device 800 that may be used in a system implementing the techniques described herein, although others are possible. It should be appreciated that FIG. 8 is intended neither to be a depiction of necessary components for a computing device to operate in accordance with the principles described herein, nor a comprehensive depiction.

Computing device 800 may comprise at least one processor 802, a network adapter 804, and computer-readable storage media 806. Computing device 800 may be, for example, a desktop or laptop personal computer, a personal digital assistant (PDA), a smart mobile phone, a server, or any other suitable computing device. Network adapter 804 may be any suitable hardware and/or software to enable the computing device 800 to communicate wired and/or wirelessly with any other suitable computing device over any suitable computing network. Computer-readable media 806 may be adapted to store data to be processed and/or instructions to be executed by processor 802.

The data and instructions stored on the one, two, or more computer-readable storage media 1806 may comprise computer-executable instructions implementing techniques described herein. In the example of FIG. 8, computer-readable storage media 806 stores computer-executable instructions implementing various engines and storing various information as described above. Computer-readable storage media 806 may store an ingestion facility 808 that, when executed on the processor(s) 802, implements an a system for ingesting media content. Computer-readable storage media 806 may also store an attribute update facility 810 that, when executed on the processor(s) 802, implements an attribute update engine that carries out an update of the attributes of a media content, using any of the exemplary techniques described herein. A score facility 812 may be stored on the computer-readable storage media 806. The score facility 812, when executed by the processor(s) 802, implements a score facility that carries out a score creation and updates for users and media content. A distributed data store 814 may be stored on the computer-readable storage media 806. The distributed data store 814 may include any of the distributed storage systems discussed above. As should be appreciated from the above discussion of techniques that may be used may not use all of the components listed herein. Additionally, while the score facility 812 is illustrated as separate from the attribute update facility 810, in some embodiments the score facility 812 may form a part of the attribute update facility 810. While the example of FIG. 8 illustrates multiple facilities 808, 810, 812, and 814 embodiments are not limited to implementing all of these facilities or implementing all of these facilities together on one computing device. Rather, embodiments may implement any suitable facility or combination of facilities in any suitable system including one or more devices.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Accordingly, the foregoing description and drawings are by way of example only.

What is claimed is:

1. At least one non-transitory computer-readable storage medium, for maintaining a distributed data store storing information regarding each of a plurality of media contents, a transaction record for each of the plurality of media contents, and a record of user interactions with the plurality of media contents, wherein the at least one non-transitory computer-readable storage medium stores a plurality of facilities, wherein the plurality of facilities comprise computer-executable instructions that, when executed by at least one processor, cause the at least one processor to perform a method comprising:

receiving, with a first facility of the plurality of facilities that is executed by the at least one processor, a first request from a first user to add information regarding a first media content to the distributed data store, wherein the first request comprises information regarding the first media content;

adding, with the first facility, the information regarding the first media content to the distributed data store at least in part by creating a first transaction record for the first media content, wherein the first transaction record comprises an identifier of the first user, an identifier of the first media content, and one or more identifiers of one or more tagged users identified in the information regarding the first media content having an association with the first media content;

for each of the one or more tagged users:
 receiving, with a second facility of the plurality of facilities that is executed by the at least one processor, from the first facility, an identifier of a first tagged user of the one or more tagged users;
 sending, with the second facility, a first notification to the first tagged user to confirm or challenge the association of the first tagged user with the first media content;
 receiving, with the second facility, an indication that the first tagged user has challenged the association of the first tagged user with the first media content; and
 in response to receiving the indication that the first tagged user has challenged the association, recording a conflict with the second facility, wherein recording the conflict further comprises creating an entry in the first transaction record for the conflict;

counting, with a third facility of the plurality of facilities that is executed by the at least one processor, a number of conflicts recorded in the first transaction record, wherein the counting further comprises generating a counted number of conflicts;

evaluating, with the third facility, the information regarding the first media content, wherein the evaluating comprises determining whether the information regarding the first media content includes at least one value for each of a plurality of attributes, the plurality of attributes being a minimum permissible characterization of the first media content;

retrieving, with the third facility, a trust score of the first user;

generating, with the third facility, a reliability score of the information regarding the first media content based on (1) the determining whether the information regarding the first media content does or does not include the minimum permissible characterization of the first media content, (2) the retrieved trust score of the first user, and (3) the counted number of conflicts in the first transaction record;

outputting the generated reliability score of the information regarding the first media content;

receiving a second request to access the first media content, wherein the second request comprises the identifier of the first media content;

retrieving the reliability score of the information regarding the first media content;

determining whether the retrieved reliability score is greater or equal to a threshold level; and based on the determining that the retrieved reliability score is greater or equal to the threshold level, providing access to the first media content.

2. The computer-readable storage medium of claim 1, wherein:
the minimum permissible characterization comprises a title of the first media content, an identity of an owner of the first media content, and an identity of a creator of the first media content, and
the evaluating the information regarding the first media content further comprises determining that the information regarding the first media content includes the identity of the owner of the first media content and the identity of the creator of the first media content.

3. The computer-readable storage medium of claim 2, wherein:
the minimum permissible characterization further comprises rights information regarding the first media content, and
the evaluating the information regarding the first media content further comprises determining that the information regarding the first media content includes the rights information regarding the first media content.

4. The computer-readable storage medium of claim 2, wherein:
the minimum permissible characterization further comprises an identity of a publisher of the first media content, and
the evaluating the information regarding the first media content further comprises determining that the information regarding the first media content includes the identity of the publisher of the first media content.

5. The computer-readable storage medium of claim 1, wherein:
    the distributed data store comprises a blockchain and the blockchain stores one or more records containing the information regarding the first media content.

6. The computer-readable storage medium of claim 1, wherein outputting the generated reliability score further comprises storing the generated reliability score in the distributed data store.

* * * * *